United States Patent
Astigarraga et al.

(10) Patent No.: US 10,116,496 B2
(45) Date of Patent: Oct. 30, 2018

(54) METHOD OF IMPROVING CLOUD RESILIENCY

(71) Applicant: INTERNATIONAL BUSINESS MACHINES CORPORATION, Armonk, NY (US)

(72) Inventors: Tara Astigarraga, Fairport, NY (US); Christopher V. Derobertis, Hopewell Junction, NY (US); Louie A. Dickens, Tucson, AZ (US); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 14/605,247

(22) Filed: Jan. 26, 2015

(65) Prior Publication Data
US 2016/0218914 A1    Jul. 28, 2016

(51) Int. Cl.
*H04L 12/24* (2006.01)
*H04L 12/26* (2006.01)

(52) U.S. Cl.
CPC ...... *H04L 41/0686* (2013.01); *H04L 41/0631* (2013.01); *H04L 43/16* (2013.01)

(58) Field of Classification Search
CPC ......... H04L 45/28; H04L 45/22; H04L 45/00; H04L 29/14; H04L 12/2422
See application file for complete search history.

(56) References Cited

U.S. PATENT DOCUMENTS

| | | | |
|---|---|---|---|
| 6,308,282 B1 | 10/2001 | Huang et al. | |
| 6,925,335 B2* | 8/2005 | May | G06F 11/0742 700/65 |
| 6,980,993 B2* | 12/2005 | Horvitz | G06F 21/335 |
| 8,111,625 B2 | 2/2012 | Hof | |
| 8,209,758 B1* | 6/2012 | Doukhvalov | H04L 63/1433 726/24 |
| 8,423,630 B2* | 4/2013 | Ciscon | H04L 29/06 709/223 |
| 8,612,599 B2* | 12/2013 | Tung | G06F 11/3495 709/224 |
| 8,760,298 B2* | 6/2014 | Cavanaugh | H04W 4/02 340/539.13 |
| 8,761,355 B2* | 6/2014 | Reding | H04M 3/387 379/211.01 |
| 8,862,762 B1* | 10/2014 | Motrenko | H04L 51/10 709/230 |
| 9,019,099 B2* | 4/2015 | Fox | A61B 5/0022 128/903 |
| 9,432,821 B2* | 8/2016 | Van Snellenberg | H04W 4/14 |
| 9,473,867 B2* | 10/2016 | Takamatsu | H04R 29/004 |
| 2006/0031482 A1 | 2/2006 | Mohan et al. | |

(Continued)

*Primary Examiner* — Mark Rinehart
*Assistant Examiner* — Sanjay K Dewan
(74) *Attorney, Agent, or Firm* — Griffiths & Seaton PLLC

(57) ABSTRACT

Methods, computer systems, and computer program products for improving resiliency in a network of computing components functioning according to a multilayered Open Systems Interconnection (OSI) model include, upon exceeding a predetermined threshold for at least one of the multiple layers in the OSI model, for a certain event, a real-time notification of the event is provided in an inter-layer basis such that the responsible entity manages the event according to an OSI model-wide system.

18 Claims, 6 Drawing Sheets

(56) References Cited

U.S. PATENT DOCUMENTS

| | | | |
|---|---|---|---|
| 2006/0092827 A1* | 5/2006 | Jain | H04L 41/0213 370/216 |
| 2012/0075988 A1* | 3/2012 | Lu | H04L 45/02 370/218 |
| 2016/0134487 A1* | 5/2016 | Lingafelt | H04L 12/28 370/216 |
| 2016/0205002 A1* | 7/2016 | Rieke | H04L 43/045 709/224 |

* cited by examiner

METHOD OF IMPROVING CLOUD RESILIENCY

BACKGROUND OF THE INVENTION

Field of the Invention

The present invention relates in general to computers, and more particularly to the Cloud and the Internet. Still more particularly, the present invention relates to methods, computer systems, and computer program products for improving cloud resiliency.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon the Cloud to store information and data. As wide strides in technological advancement relating to data access devices have been accomplished, there is an ever-growing demand for growth and development within the back end supporting systems that provide and store the data content.

SUMMARY OF THE DESCRIBED EMBODIMENTS

As aforementioned, the Internet has grown exponentially each year. Individuals and businesses have come to rely on the Internet on a daily basis, often storing vast and important information on data servers, or the Cloud. One of the simplest ways of explaining and understanding the Internet is using the Open Systems Interconnection (OSI) model. The OSI model is a conceptual model that characterizes and standardizes the internal functions of a communication system by partitioning it into abstraction layers. The model consists of seven logical layers, each serving the layer above and below it, providing a network path needed by the applications it uses.

With few exceptions, the seven layers in the OSI model do not communicate with each other. For the majority, each of the layers are isolated from the other layers, notwithstanding each depends on one another to provide a seamless experience for the end user. Historically, this has not been problematic as there has been no requirement for resiliency, and only a minimal requirement for fault tolerance. With the growing dependency upon large data servers, or the Cloud, comes a tremendous requirement for reliability and resiliency.

Accordingly, various methods, systems, and computer program product embodiments for improving cloud resiliency by a processor device are provided. In one embodiment, by way of example only, the method comprises: upon exceeding a predetermined threshold for at least one of the multiple layers for a certain event, providing a real-time notification of the event in an inter-layer basis such that the responsible entity manages the event according to an OSI model-wide system.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and program product codes for improving cloud resiliency by a processor device wherein upon exceeding a predetermined threshold for at least one of the multiple layers for a certain event, providing a real-time notification of the event in an inter-layer basis such that the responsible entity manages the event according to an Open System Interconnection (OSI) model-wide system.

Described embodiments, and illustrative Figures for improving could resiliency are to follow. In the interest of clarity, not all features of an actual implementation are described in this Specification. It will of course be appreciated by one of ordinary skill in the art, that in the development of any such actual embodiment, numerous implementation-specific decisions must be made to achieve the developers specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Figure 1:
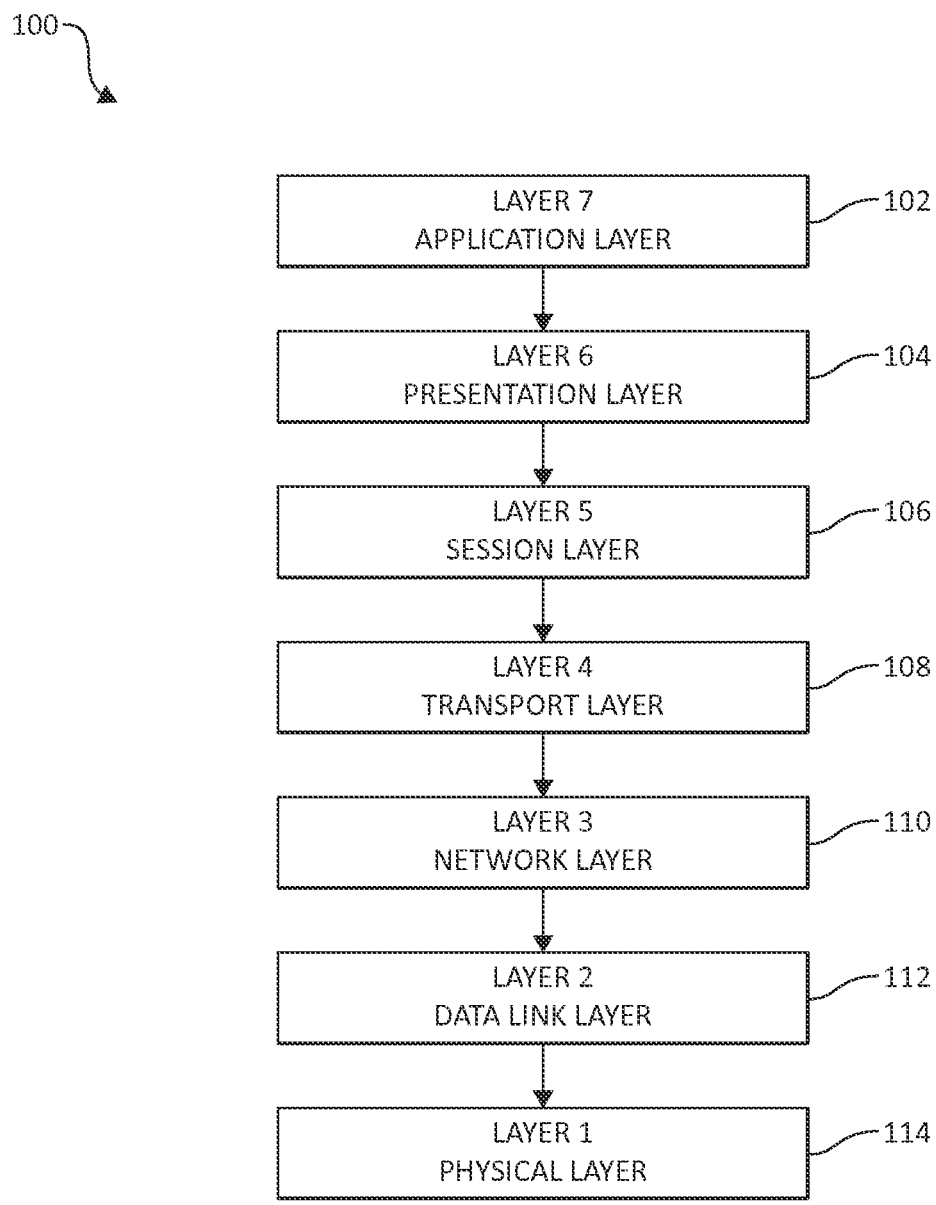
FIG. 1 illustrates the functional layers of the Open System Interconnection (OSI) model.

As aforementioned, the Open Systems Interconnection (OSI) model is one simple way of describing the data path over a communication system between one or more computing devices, or even more simply, the Internet. As illustrated in FIG. 1, the OSI model 100 consists of seven separate, isolated layers. Layer 1, or the Physical Layer 114; Layer 2, or the Data Link Layer 112; Layer 3, or the Network Layer 110; Layer 4, or the Transport Layer 108; Layer 5, or the Session Layer 106; Layer 6, or the Presentation Layer 104; and Layer 7, or the Application Layer 102.

With few exceptions, these layers do not communicate with each other, yet all depend implicitly on one another to move data from one location to another. Businesses, such as International Business Machines, Inc. (IBM), and their clients, as well as the public as a whole, rely on these separate layers each day in what is generally an unseen, and often unappreciated, quartet of orchestrated data movement. Software and hardware from any number of vendors must work together seamlessly for these seven layers to function.

Figure 2:
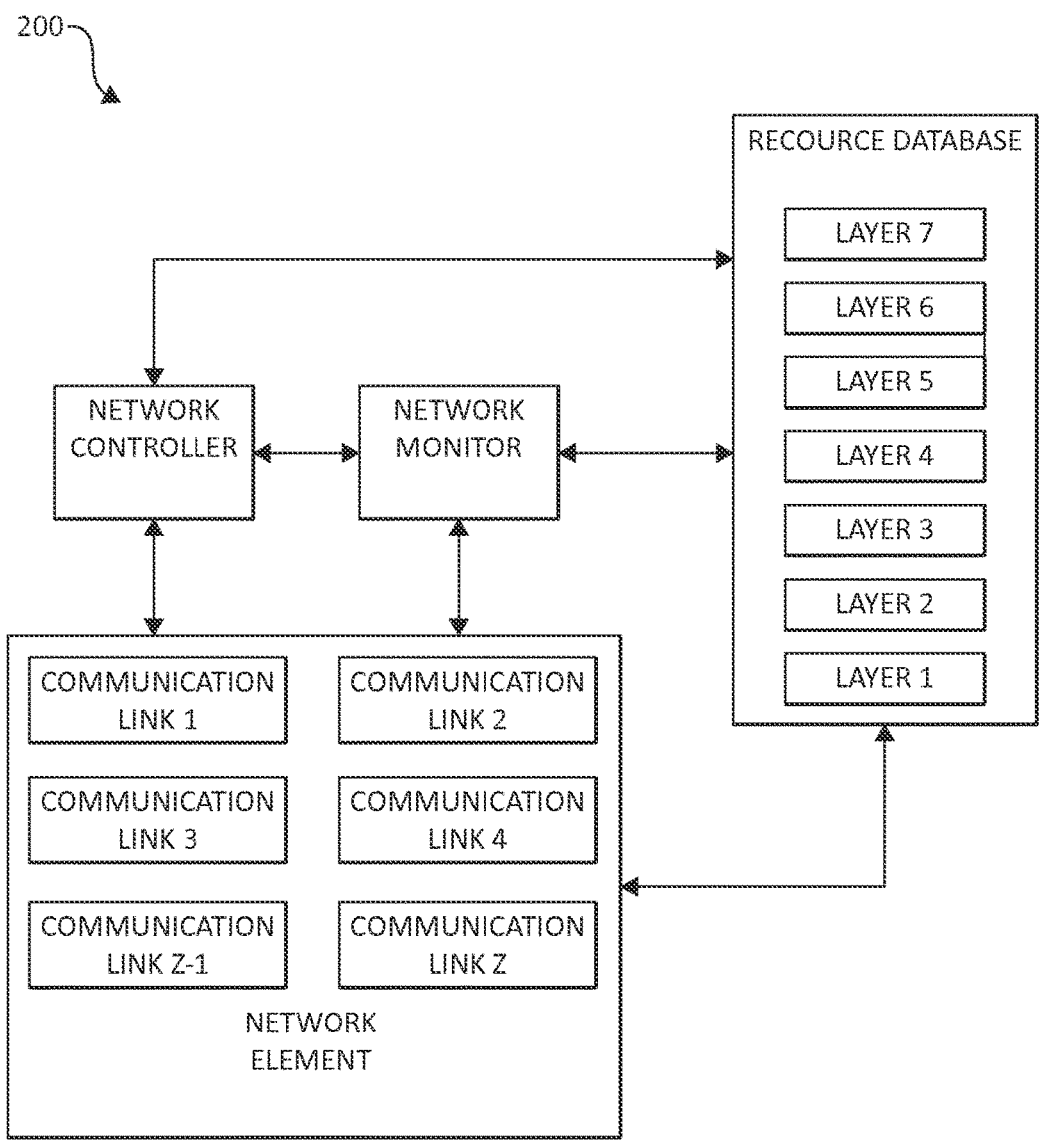
FIG. 2 illustrates a prior art system for monitoring OSI layers.

Relatively few attempts to monitor failure events within the layers of the OSI model 100 have been made. One attempt, illustrated in FIG. 2 shows a prior art communication monitoring system 200. This system requires the use of an additional hardware component, called the "network monitor". Additionally, this system completely reprovisions the network when a single quality of service event is detected. The disadvantage to this is that in any given data communication session, there are often several quality of service events, nevertheless a reprovision of the network is not warranted.

The present invention is available to existing computing systems without the need for separate hardware, and consists of monitoring and extending each of the seven layers of the OSI model 100, and providing a Software Defined Network, or end user, information regarding the availability, reliability, and performance of the network. The present invention considers a predefined threshold of predefined events that may be set, before which action is taken regarding quality of service issues in the network system. This ensures that neither the network is reprovisioned, nor the end user or program is notified, unnecessarily.

Figure 3:
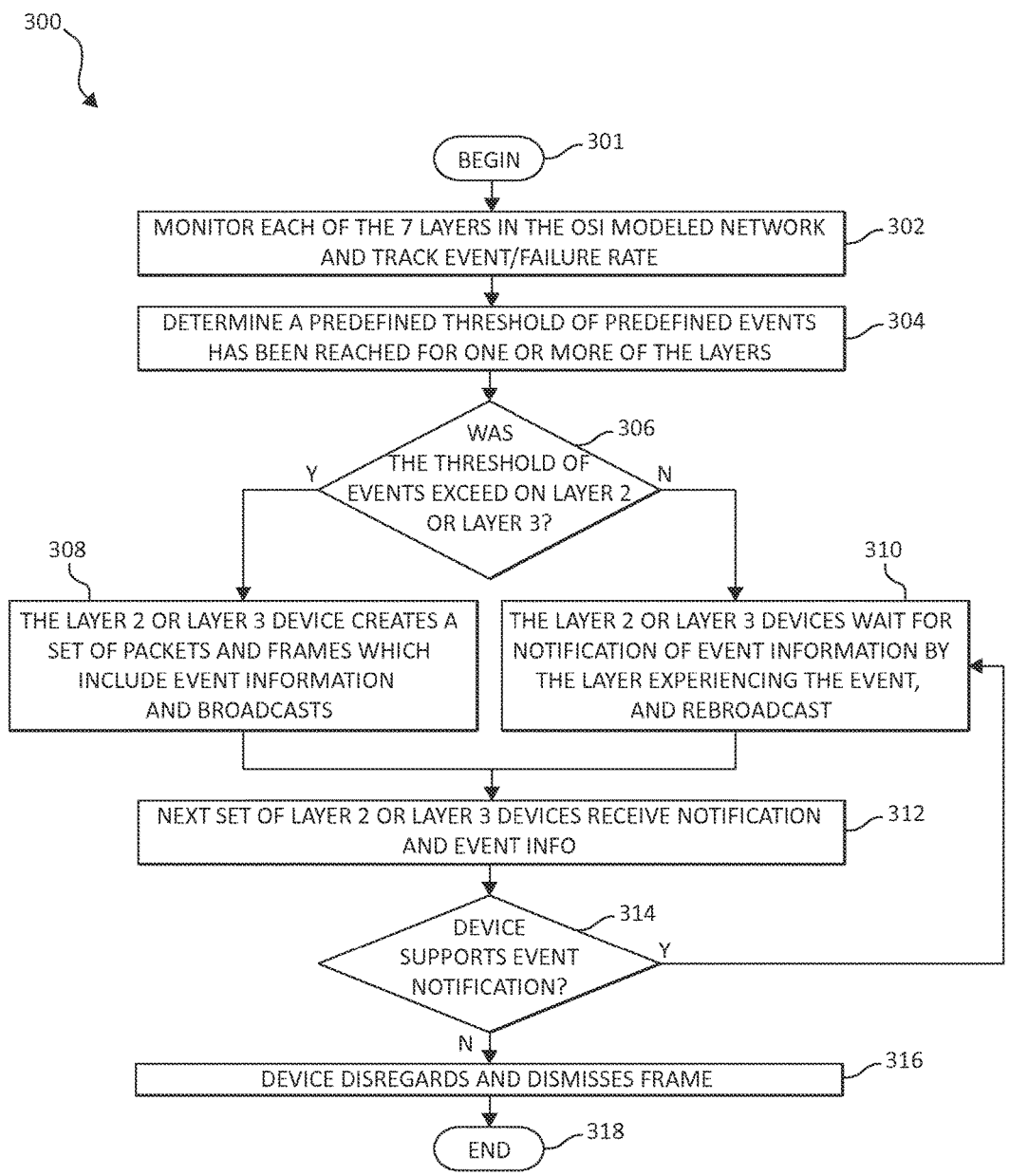
FIG. 3 illustrates a flow chart according to one aspect of the present invention.
Figure 4A:
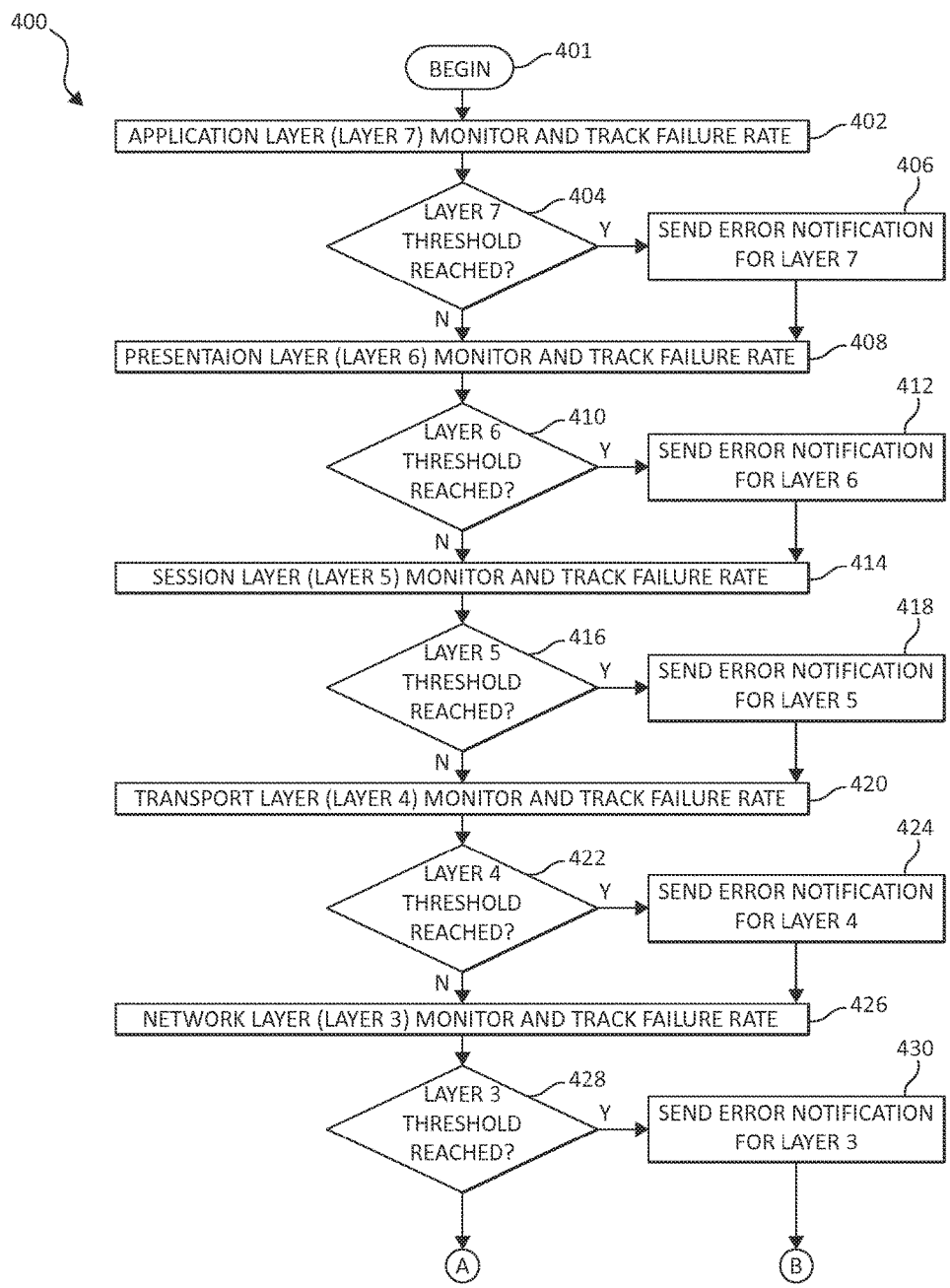
FIG. 4A illustrates a flow chart according to one aspect of the present invention.
Figure 4B:
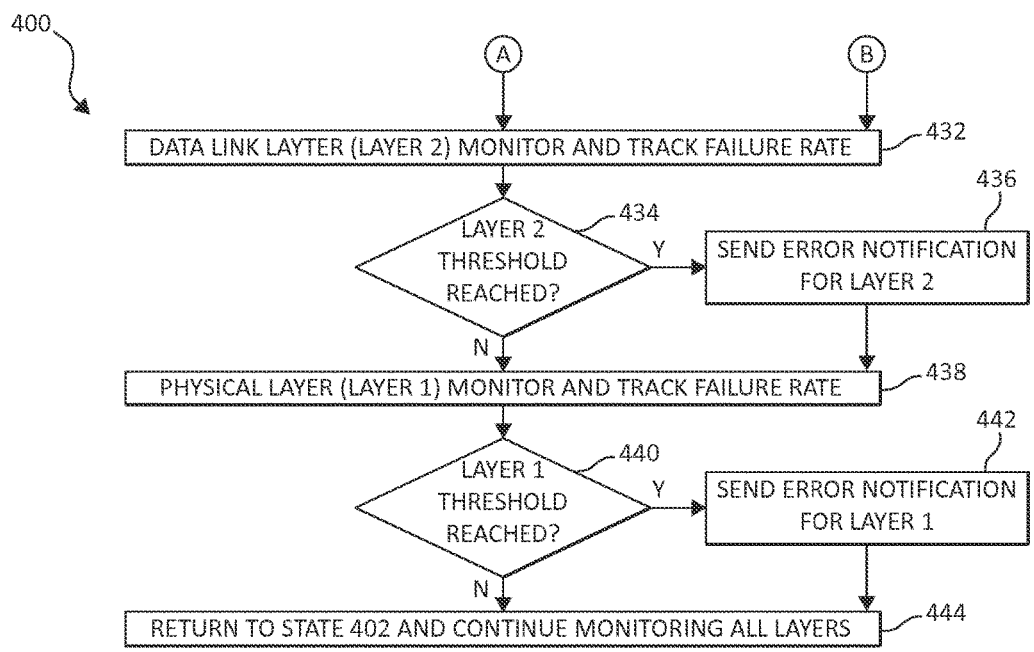
FIG. 4B illustrates a flow chart continuing from FIG. 4A.

Turning now to FIG. 3, which illustrates one example of one embodiment of the present invention, a method for improving cloud resiliency 300 is shown. The process begins at step 301 and includes monitoring each of the seven layers in the OSI modeled network, tracking event information and failure rates 302 that would impact the quality of service. FIG. 4A/B shows this process in more detail and will be described further below. Once it has been determined that a predefined threshold of predefined events has been reached for one or more of the layers 304, the action taken depends upon the layer experiencing the event. Since layer two and layer three are the only functional layers that include devices (i.e. routers or modems) capable of broadcasting or rebroadcasting event information, step 306 shows that if the predefined threshold of events has been reached internally on layer two or layer three 308, the layer two or three device that experiences the event or failure creates and broadcasts a set of packets and frames containing a description of the event or failure information that occurred. The layer two or layer three device then broadcasts the notification on all of its ports, such as to saturate the network with the event or failure information and description.

Step 310 shows that if the predefined threshold of events was not experienced on a layer two or layer three device, the layer two or layer three device will continue functioning on the network as normal until it has itself received information describing event or failure information. In either instance, after the notification has been broadcast by the layer two or layer three device, the next layer two or layer three device in the network line will receive the notification 312. The action taken by the layer two or layer three device will depend on the specific devices' capabilities. Specifically, whether the layer two or layer three device supports event notification 314. If the device has the capability to support event notification and rebroadcast the notification, it will do so through all of its ports except the port on which the notification was received 310. If the device does not have the capability of supporting event notification, the device will harmlessly disregard and dismiss the frame 316. At 318 the process ends.

Each layer is monitored for event or failure information that may impact the quality of service, until the predefined threshold of predefined events is reached, at which point the objective is to get the description of the event or failure information to all layer two or layer three devices on the network, for dissemination. FIG. 4A/B illustrates further one aspect of one example of one embodiment of the present invention at the step of monitoring 400. Beginning at 401, layer seven, or the Application Layer is monitored and event or failure information is recorded and tracked 402. If the predefined threshold of events is reached 404, a notification of event or failure information for Layer seven is sent 406. Assuming the threshold has not been reached, layer six, or the Presentation Layer is monitored and event or failure information is recorded and tracked 408. If the predefined threshold of events is reached 410, a notification of event or failure information for Layer six is sent 412. Assuming the threshold has not been reached, layer five, or the Session Layer is monitored and event or failure information is recorded and tracked 414. If the predefined threshold of events is reached 416, a notification of event or failure information for Layer five is sent 418. Assuming the threshold has not been reached, layer four, or the Transport Layer is monitored and event or failure information is recorded and tracked 420.

If the predefined threshold of events is reached 422, a notification of event or failure information for Layer four is sent 424. Assuming the threshold has not been reached, layer three, or the Network Layer is monitored and event or failure information is recorded and tracked 426. If the predefined threshold of events is reached 428, a notification of event or failure information for Layer three is sent 430. Assuming the threshold has not been reached, layer two, or the Data Link Layer is monitored and event or failure information is recorded and tracked 432. If the predefined threshold of events is reached 434, a notification of event or failure information for Layer two is sent 436. Assuming the threshold has not been reached, layer one, or the Physical Layer is monitored and event or failure information is recorded and tracked 438. If the predefined threshold of events is reached 440, a notification of event or failure information for Layer one is sent 442. Assuming the threshold has not been reached, the process returns to state 402 and continually monitors each of the seven layers.

Figure 5:
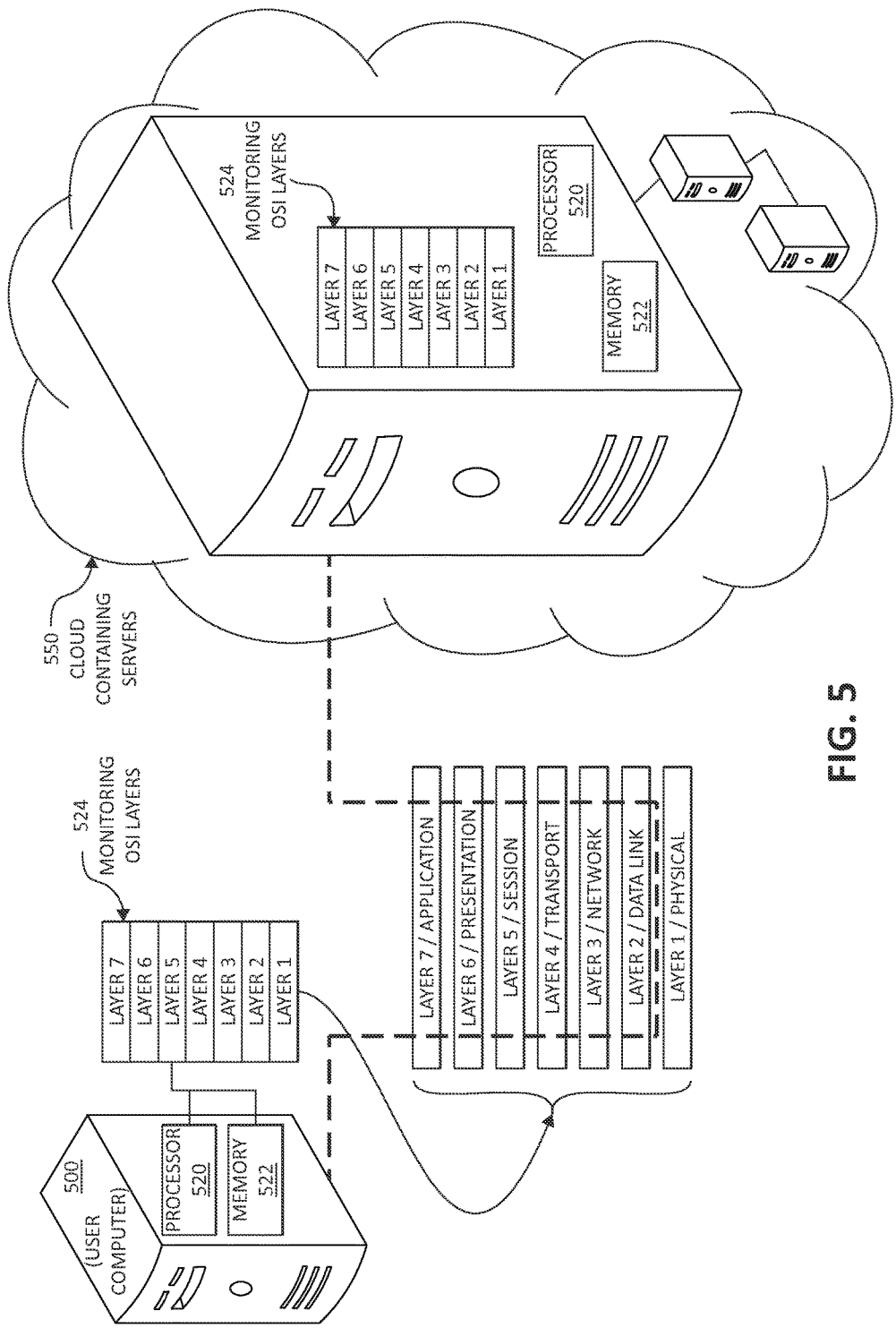
FIG. 5 illustrates a simplified communication system using the OSI model and according to one aspect of the present invention.

FIG. 5 illustrates one simplistic view of a client computing system 500 in communication with a server computing system 550, or more simply, the Cloud, in which one example of one embodiment of the present invention may be appreciable. The user computing system 500 includes one or more processors 520 and memory 522, in communication with a server computing system 550 containing similar processors 520 and memory 522. The dashed line may represent the path data may take in reference to the OSI reference model 100. 524 represents an implementation of one example of one embodiment of the present invention in which one or more computing systems are continually monitoring and tracking event or failure information for OSI layers one through seven.

The events described in the aforementioned process may be simply abnormalities or quality of service failure events, the scope of which will be dependent upon the specific implementation of the present invention. Furthermore, for each layer, predefined events such as key area thresholds may be applied, and will be separate and distinct for each layer. An example of key area threshold items, for layer two devices for example, may be spanning tree problems, frame check sequence errors, receipt of x number of jabber in n time, receipt of x number of runts in n time, or any other event or failure that may affect normal function of the device or impact the quality of service. Furthermore, by way of example only, layer three devices may have key area threshold items such as changes in IP address, destination host unreachable errors, source route failed errors, network unreachable errors, destination protocol unreachable, or any other event or failure that may affect normal function of the device or impact the quality of service.

The broadcasting of event notification in the aforementioned process may use any and all accepted standards of event notification. Such examples may include broadcasting, or IPv4, multi-casting, or IPv6, MAC address broadcasting, or any other method of sending or relaying event description information, the aforementioned as limited examples only.

It should be noted that the above-described process has been placed in numerical order for convenience. In an actual implementation of the present invention, it should be appreciated that depending on the specific goals of the developer, the described process may function within the layers of the OSI method 100 in any such order. Additionally, each layer may be monitored separately, or the monitoring may be homogeneous and occurring continually. Furthermore, it should be appreciated that depending upon the specific situation, not all layers must be present to function appropriately, as one of ordinary skill in the art would widely recognize.

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for improving resiliency in a network of computing components functioning according to a multilayered Open Systems Interconnection (OSI) model by a processor device, comprising:

upon exceeding a predetermined threshold for at least one of the multiple layers for a certain event, providing a real-time notification of the event in an inter-layer basis such that a responsible entity comprising a device which detected the event manages the event according to an OSI model-wide system; wherein managing the event further includes notifying, directly by the device which detected the event, all layer 2 or layer 3 devices on the network of the event, the layer 2 or layer 3 devices which support event notification rebroadcasting the notification; and wherein rebroadcasting the notification by layer 2 or layer 3 devices further includes rebroadcasting the notification through all ports of the layer 2 or layer 3 device, except the port from which the notification was received, such as to flood the network to ensure dissemination of the notification; and using a separate value of the predetermined threshold for a given instance of the certain event in each one of the multiple layers such that the predetermined threshold differs per given instance of the certain event within a respective one of the multiple layers; wherein, for the layer 2 devices, the certain event comprises detecting at least one of frame check sequence errors, receipt of a number x of jabber within a number n amount of time, and receipt of a number y of runts within a number z amount of time; and wherein, for the layer 3 devices, the certain event comprises detecting at least one of changes in Internet Protocol (IP) addresses, destination host unreachable errors, source route failed errors, and network unreachable errors.

2. The method of claim 1, wherein devices that do not support event notification harmlessly disregard the notification frame.

3. The method of claim 1, wherein notifying further comprises creating, by the layer 2 or layer 3 device, a set of packets and frames containing the layer's threshold event information describing the event that occurred.

4. The method of claim 1, wherein exceeding a predetermined threshold further includes setting user-defined key area thresholds for each layer in the OSI model.

5. The method of claim 1, wherein the certain event is a failure event in a communications link between one or more layers.

6. The method of claim 1, wherein the notification is performed by a firmware update to computing components.

7. A system for improving resiliency in a network of computing components functioning according to a multilayered Open Systems Interconnection (OSI) model, comprising:

at least one processor device, operable within the OSI model environment, wherein the at least one processor device:

upon exceeding a predetermined threshold for at least one of the multiple layers for a certain event, provides a real-time notification of the event in an inter-layer basis such that a responsible entity comprising a device which detected the event manages the event according to an OSI model-wide system; wherein managing the event further includes notifying, directly by the device which detected the event, all layer 2 or layer 3 devices on the network of the event, the layer 2 or layer 3 devices which support event notification rebroadcasting the notification; and wherein rebroadcasting the notification by layer 2 or layer 3 devices further includes rebroadcasting the notification through all ports of the layer 2 or layer 3 device, except the port from which the notification was received, such as to flood the network to ensure dissemination of the notification; and uses a separate value of the predetermined threshold for a given instance of the certain event in each one of the multiple layers such that the predetermined threshold differs per given instance of the certain event within a respective one of the multiple layers; wherein, for the layer 2 devices, the certain event comprises detecting at least one of frame check sequence errors, receipt of a number x of jabber within a number n amount of time, and receipt of a number y of runts within a number z amount of time; and wherein, for the layer 3 devices, the certain event comprises detecting at least one of changes in Internet Protocol (IP) addresses, destination host unreachable errors, source route failed errors, and network unreachable errors.

8. The system of claim 7, wherein devices that do not support event notification harmlessly disregard the notification frame.

9. The system of claim 7, wherein the at least one processor device notifies, the notifying further comprising creating, by the layer 2 or layer 3 device, a set of packets and frames containing the layer's threshold event information describing the event that occurred.

10. The system of claim 7, wherein exceeding a predetermined threshold further includes setting user-defined key area thresholds for each layer in the OSI model.

11. The system of claim 7, wherein the certain event is a failure event in a communications link between one or more layers.

12. The system of claim 7, wherein the notification is performed by a firmware update to computing components.

13. A computer program product for improving resiliency in a network of computing components functioning according to a multilayered Open Systems Interconnection (OSI) model by at least one processor device operable within the OSI model, the computer program product comprising a non-transitory computer-readable storage medium having computer-readable program code portions stored therein, the computer-readable program code portions comprising:

a first executable portion that, upon exceeding a predetermined threshold for at least one of the multiple layers for a certain event, provides a real-time notification of the event in an inter-layer basis such that a responsible entity comprising a device which detected the event manages the event according to an OSI model-wide system; wherein managing the event further includes notifying, directly by the device which detected the event, all layer 2 or layer 3 devices on the network of the event, the layer 2 or layer 3 devices which support event notification rebroadcasting the notification; and wherein rebroadcasting the notification by layer 2 or layer 3 devices further includes rebroadcasting the notification through all ports of the layer 2 or layer 3 device, except the port from which the notification was received, such as to flood the network to ensure dissemination of the notification; and a second executable portion that uses a separate value of the predetermined threshold for a given instance of the certain event in each one of the multiple layers such that the predetermined threshold differs per given instance of the certain event within a respective one of the multiple layers; wherein, for the layer 2 devices, the certain event comprises detecting at least one of frame check sequence errors, receipt of a number x of jabber within a number n amount of time, and receipt of a number y of runts within a number z amount of time; and wherein, for the layer 3 devices, the certain event comprises detecting at least one of changes in Internet Protocol (IP) addresses, destination host unreachable errors, source route failed errors, and network unreachable errors.

14. The computer program product of claim 13, wherein devices that do not support event notification harmlessly disregard the notification frame.

15. The computer program product of claim 13, further comprising a third executable portion that notifies, wherein notifying further comprises creating, by the layer 2 or layer 3 device, a set of packets and frames containing the layer's threshold event information describing the event that occurred.

16. The computer program product of claim 13, wherein exceeding a predetermined threshold further includes setting user-defined key area thresholds for each layer in the OSI model.

17. The computer program product of claim 13, wherein the certain event is a failure event in a communications link between one or more layers.

18. The computer program product of claim 13, wherein the notification is performed by a firmware update to computing components.

\* \* \* \* \*